Jan. 12, 1926.
LE ROY H. HOFFER
1,569,323
PRESS AND SIMILAR MACHINE
Filed June 18, 1924
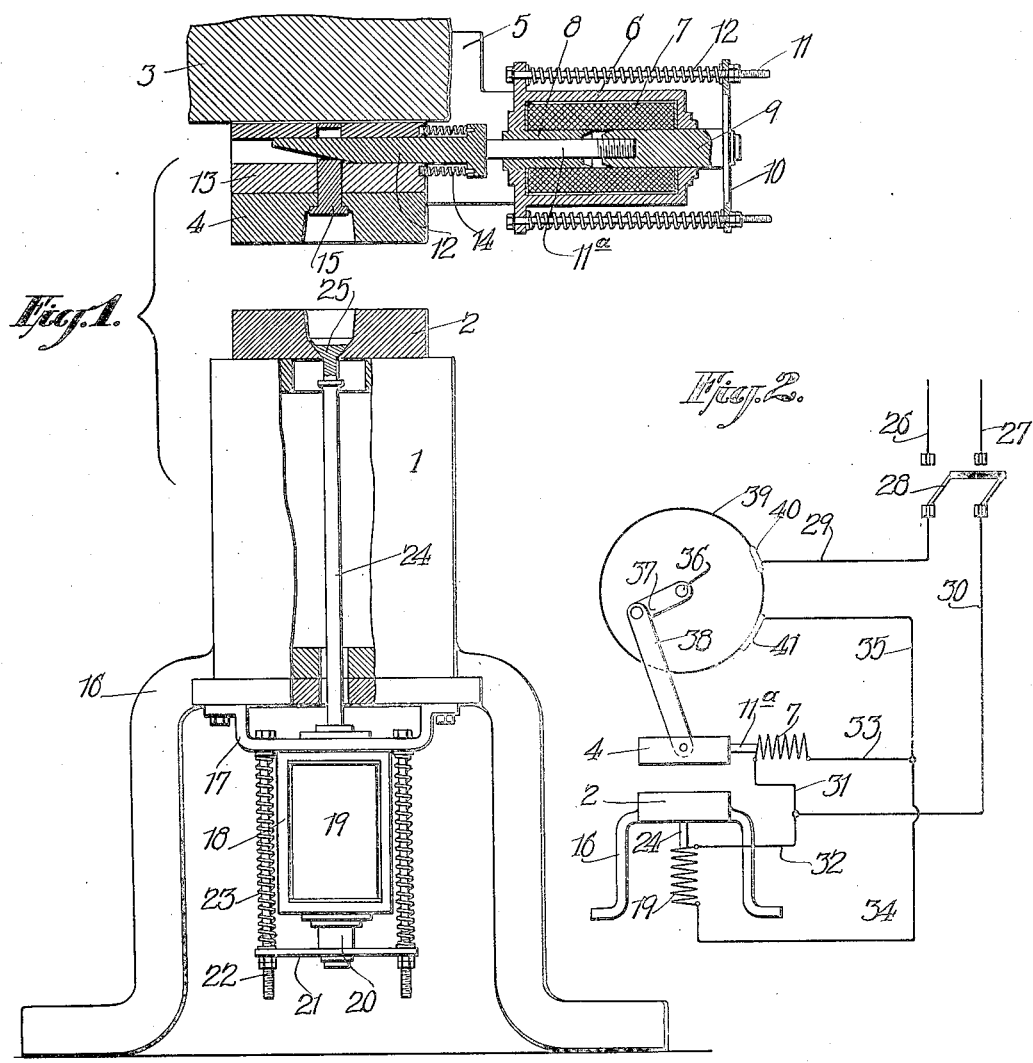
Inventor
LeRoy H. Hoffer
By his Attorney
D. Anthony Usina Patented Jan. 12, 1926.

1,569,323

UNITED STATES PATENT OFFICE.

LE ROY H. HOFFER, OF BROOKLYN, NEW YORK, ASSIGNOR TO THOMAS E. MURRAY, OF BROOKLYN, NEW YORK.

PRESS AND SIMILAR MACHINE.

Application filed June 18, 1924. Serial No. 720,743.

*To all whom it may concern:*

Be it known that I, LE ROY H. HOFFER, a citizen of the United States, and resident of Brooklyn, New York, have invented certain new and useful Improvements in Presses and Similar Machines, of which the following is a specification.

My invention aims to provide an improved mechanism for removing articles from the dies, electrodes or similar tools of welding machines, power presses, drop hammers and the like. I provide a "knock-out," as such removing devices are commonly called, which operates with certainty and safety and without delay.

When metal objects are stamped, drawn or the like, or when two metal pieces are welded together under pressure, the finished article often sticks in the die or electrode or on the punch or similar tool. In power presses a knock-out is usually provided which is connected to the moving ram of the press and actuated by the return movement of the ram. With welding machines the knock-out rod is usually operated by a lever mechanism for applying the necessary pressure, actuated by a handle, a lever or a pedal.

I propose to provide a solenoid or other magnet or electric motor for this purpose, with advantages referred to hereinafter in detail.

The accompanying drawings illustrate an embodiment of the invention.

Fig. 1 is a side elevation of the electrodes and adjacent parts of a butt welding machine;

Fig. 2 is a diagram illustrating the electrical connections.

Referring to the embodiment of the invention illustrated, the transformer 1 supports a stationary electrode 2. The reciprocating head 3 of the machine carries on its underside the upper, in this case the movable, electrode 4. The head 3 is moved downward by suitable mechanism to bring together the parts carried in the sockets of the electrodes 2 and 4, to press them together while a welding current is passed across the joint. When the weld is completed, the head 3 and upper electrode 4 are lifted. Sometimes the welded article sticks in the upper electrode and is carried up therewith. Sometimes it sticks in the lower electrode.

The head 3 has at its lower end arms or brackets 5 extending to one side and carrying or constituting an iron frame 6 in which is carried a solenoid 7 provided with a stationary core 8 and a movable core or plunger 9 on the rear end of which is a cross arm 10 the ends of which slide on rods 11 and bear against springs 12; so that when there is no current passing through the solenoid the springs will press or hold the plunger 9 retracted.

At its forward end the plunger 9 carries a rod 11$^a$ which bears against the end of a wedge 12 moving in a horizontal passage in a block 13 which constitutes in effect part of the plunger. Springs 14 are arranged to retract the wedge 12 when the solenoid is de-energized. The knock-out pin 15 has a stem which moves in a vertical passage through the block 13, the stem having a horizontal opening through which the end of the wedge passes. Thus when the wedge is advanced the knock-out pin is actuated downward. During a welding operation the wedge 12 is retracted and the knock-out pin 15 is allowed to move to its upper position.

On the bottom frame 16 of the machine is mounted a bracket 17 carrying an iron frame 18 in which is a solenoid 19 with a plunger 20 the rear end of which carries a cross arm 21 sliding on rods 22 and retracted by springs 23. The plunger carries a rod 24 which bears directly against the underside of the knock-out pin 25 in the lower electrode. When the solenoid 19 is actuated, therefore, it operates the knockout to eject the welded article if the latter has stuck in the lower electrode. When the solenoid 19 is dead, the knock-out pin is free to be pressed back by the work.

Referring to Fig. 2, the solenoid coils are indicated at 7 and 19. They are in parallel circuits. The current from the wires 26 and 27 passes through a switch 28 to wires 29 and 30; the latter being connected by branches 31 and 32 to the solenoids whence the current passes by wires 33 and 34 to a common wire 35 and thence through an automatic switch to a connection with the wire 29, which completes the circuit. Thus both solenoids are energized and both knock-outs are actuated and the welded article is knocked out whether it has stuck in the top electrode or in the bottom one. The wire 35 may be connected directly and permanently to the wire 29. In that case the knock-out mechanism will be actuated by the closing of the switch 28 by hand after each operation, and the switch will be opened again before the next operation. But with apparatus in which a more rapid operation is desired, and particularly in machines provided with an automatic feed, automatic ejection is preferable, and this I accomplish by an automatic switch of which an example is shown in Fig. 2.

The switch 28 remains closed during ordinary operation of the machine. The shaft 36 of the machine has a crank 37 which through a link 38 reciprocates the upper head and electrode 4. The crank shaft carries also a drum 39 on which is a contact 40 adapted, when the crank is approaching the top of its stroke, to push against the stationary contact 41 on the end of the line 35. The current is brought in to the movable contact 40 from the wire 29 by the usual slip ring mounted on the drum 39. As the contact 40 passes beyond the brush 41 the circuit is broken and the solenoids are deenergized to free the knock-outs.

A knock-out of this character speeds the production and relieves the operator of a certain amount of work. Compared with the arrangement of the ordinary power press, this mechanism has the advantage of freeing the lower knock-out immediately after the article has been ejected, even when the ram is in the upper position.

In ordinary power presses the lower knock-out is raised as the ram is raised and is therefore in the ejecting position when the ram is up, thus making it necessary to lower the ram somewhat in order to entirely free the knock-out so it may fall back into the die. In fact this disadvantage is present in all knock-outs which depend on the retracting movement of the ram to eject the article.

Instead of having the circuit automatically opened and automatically closed as by the drum and contacts of Fig. 2, various other methods of electric control may be applied; such for example, as the system common in other apparatus of closing the circuit by hand and opening it automatically when the ejecting operation has been completed.

Though I have described with great particularity of detail certain embodiments of my invention, yet it is not to be understood therefrom that the invention is restricted to the particular embodiments disclosed. Various modifications may be made by those skilled in the art without departing from the invention as defined in the following claims.

What I claim is:

1. A machine of the class described having a tool which engages the work and having a knock-out for removing the work from said tool and a motor for actuating the knock-out, the extent of movement of the motor being independent of that of the other parts of the machine.

2. A machine of the class described having a knock-out which actuated by an electrically controlled motor.

3. A machine of the class described having a knock-out which is actuated by a solenoid.

4. A machine of the class described having a knock-out which is actuated by an electrically controlled motor and an automatically operated switch for making and breaking the circuit of said motor.

5. A machine of the class described having a stationary die and a movable die and having separate knock-outs carried by said dies and a separate electric motor for actuating each knock-out.

6. A machine of the class described having a movable die, and having carried on said die a knock-out and an electric motor for actuating the same.

7. A machine of the class described having a stationary die and a movable die, a knock-out carried by said stationary die for removing the work therefrom and a motor for actuating said knock-out with a movement the extent of which is independent of the extent of movement of the movable die.

8. An electric welding machine having electrodes for clamping the work pieces and pressing them together, a knock-out for removing the work from one of said electrodes and a motor for actuating said knock-out the extent of movement of which is independent of that of the electrodes.

9. An electric welding machine having electrodes for clamping the work pieces and pressing them together, a knock-out for removing the work from one of said electrodes and an electric motor for actuating said knock-out.

In witness whereof, I have hereunto signed my name.

LE ROY H. HOFFER.